B. J. DOWNING & H. D. VAN CAMPEN.
Horse Hay-Rakes.

No. 167,390 — Patented Sept. 7, 1875.

Witnesses:
M. Grosskoff
M. A. Griffith

Inventors:
Burton J. Downing
Harry D. Van Campen
by Chas. M. Peck, Atty.

UNITED STATES PATENT OFFICE.

BURTON J. DOWNING AND HARRY D. VAN CAMPEN, OF DAYTON, OHIO.

IMPROVEMENT IN HORSE HAY-RAKES.

Specification forming part of Letters Patent No. 167,390, dated September 7, 1875; application filed February 6, 1875.

*To all whom it may concern:*

Be it known that we, BURTON J. DOWNING and HARRY D. VAN CAMPEN, both of Dayton, State of Ohio, have invented new and useful Improvements in Horse Hay-Rakes; and we do hereby declare that the following is a full and exact description of the same, reference being had to the accompanying drawings, and to the letters of reference marked thereon.

This invention relates to certain novel improvements in horse hay-rakes, wherein the power of the horse is employed for raising the rake-teeth at the will of the driver, and discharging the collected loads.

The nature of our invention consists, first, in the construction and arrangement of the thimbles in which the teeth are pivoted, and in the combination and arrangement of adjustable springs coiled around and secured to a circular pressure-bar in the rear of the main axle; secondly, in a pivoted rack connected by a system of levers to a foot-lever, by pressing which the rake-head may be effectually locked; thirdly, in the arrangement of an adjustable seat, adapted to the use of a man or boy.

Figure 1:
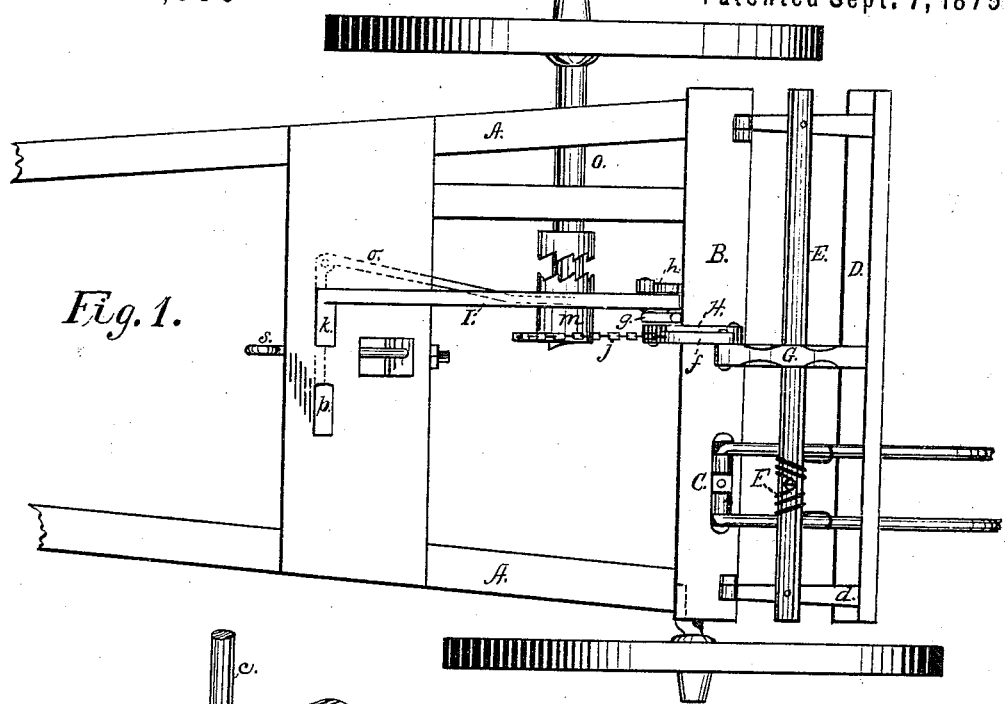
Figure 3:
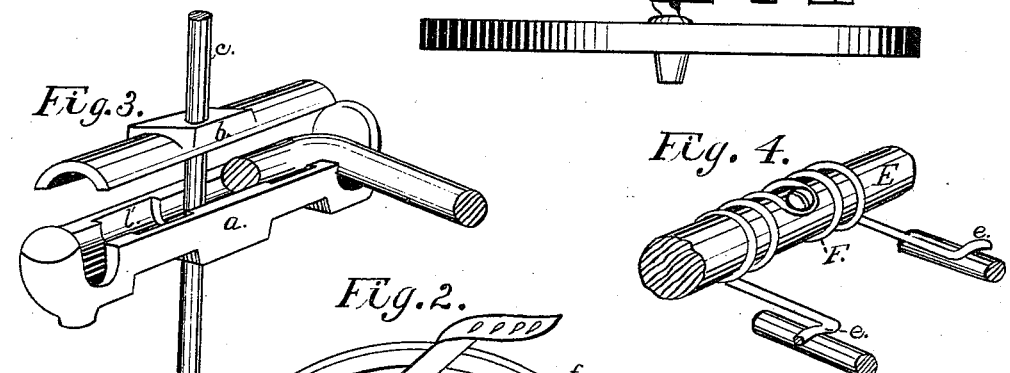
Figure 4:
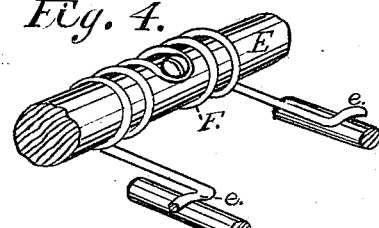
Figure 2:
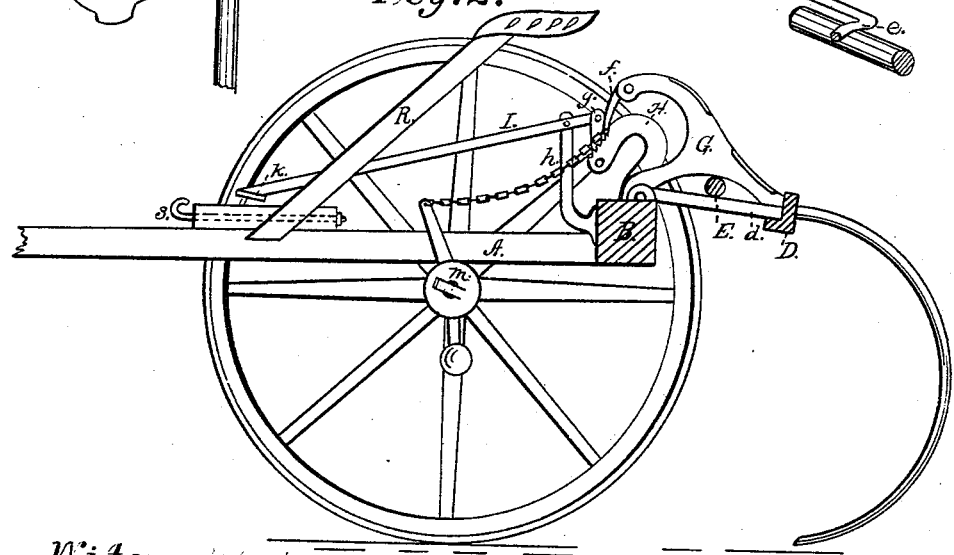

Figure 1 is a plan view of a horse hay-rake furnished with our improvements. Fig. 2 is a sectional view representing the locking and tilting devices and adjustable seat. Fig. 3 is a perspective view of our improved thimble. Fig. 4 represents the coiled adjustable springs.

The following is a description of our improvements, with such additions as are necessary to illustrate their application.

A A represent the thills, of the ordinary shape and size, and rigidly fastened to the main shaft B. Securely bolted to this shaft, at equal distances apart, are the thimbles C, Sheet 2, Fig. 4, cast in two pieces, and of the shape shown. The piece $b$ has dowel-pins upon its under side, which are set into the main shaft B, and the ends of the teeth are then placed in grooves in the thimble and the top piece $a$ fastened down upon them by a bolt, $c$. This method of hinging the teeth prevents any wear of the shaft, as is the case in the ordinary fastening where the ends of the teeth rest upon the wood. An essential feature of this tooth-holder is the chamber $b'$, designed as a receptacle for oil, and at the same time serving to reduce the friction consequent upon working the teeth, by lessening the bearing-space. We are aware that tooth-holders have been formed in two parts, and have been united in a manner similar to ours; but such holders have formed clamps to bind the teeth and hold them rigidly, while ours are constructed with a view to diminish the wear and friction of the parts without interfering with their ease and freedom of movement. D is the slotted guide-piece and lifting-bar in the rear of and parallel to the shaft B, to which it is hinged by means of the arms $d$. Upon these arms is bolted a wooden bar, E, parallel to and of the same length as the shaft B, and around the bar are coiled the springs F. The shape of these springs may be seen by reference to Fig. 4. The laterally-projecting ends $e$ rest upon the teeth in the ordinary manner, and serve to keep them down, but not too stiffly, to prevent their passing over any slight obstruction. They are fastened to the bar E by a screw, $x$, and should they become weak from use they may be tightened by removing the screw and adjusting it in another place. G is a curved lever, securely fastened at one end to the lifting-bar D, passing over the rod E, to which it is bolted, and hinged to the main shaft B. Pivoted to its upright arm is a gravitating pawl, $f$, whose engaging end takes hold of the teeth of the curved rack H. This rack is also hinged, with the lever G, to the main shaft B. A short arm, $g$, is pivoted at one end to the rack H, and at the other to the long foot-lever I, whose stirrup $k$ is conveniently near the foot of the driver. This lever is pivoted to the fulcrum-bar $h$, which is securely fastened to the main shaft B. A chain, $j$, is fastened to the engaging end of the pawl $f$ and to the upright arm of the gravitating clutch $m$, which works loose upon the end of the stub-axle O, which is rigidly attached to the wheel, and revolves with it. The clutch is operated by means of levers $o$ and a treadle, $p$.

We would thus describe the operation of our locking devices: When the rake is at work in level field with few obstructions the foot of the driver is kept upon the stirrup $k$. This effects the perfect rigidity of the rack H, and necessarily of the lifting-bar D, and the teeth have only such motion as is allowed them by the slots in said bar. Thus locking does not prevent the discharge of the collected load, for, upon throwing the clutch into gear in passing a windrow, it revolves the weighted arm $m$, and, by means of the connecting-chain $j$, first disengages the pawl $f$, raises the lifting-bar D, and with it the rake-teeth, thus discharging the load. Upon releasing the clutch the teeth fall, and the pawl, by engaging with the rack, once more locks the lifting parts.

Where the surface of the ground is uneven the rake-teeth need not be locked, as above described, and may be allowed full play.

The seat of our rake is of the ordinary construction, and fastened to a rearwardly-slanting beam, R, which passes through the platform, and is held at any position by the removable bolt S, provided at its forward end with a hook, to which the whiffletree may be attached, and passing horizontally through the platform and the beam. By having holes at intervals through the beam the height of the seat may be regulated to suit the driver.

Having fully described our invention, we claim and desire to secure by Letters Patent—

1. The hinged rack H, in combination with the foot-lever I, pawl $f$, forked lever G, chain $j$, and gravitating clutch $m$, as a means of securely locking the lifting devices of a horse hay-rake without preventing the discharge of the collected loads, substantially as described.

2. The adjustable coiled springs F, in combination with the rake-teeth, the pressure-bar E, and screw $x$ for adjusting the springs upon said bar, substantially as described.

3. The thimbles C, provided with the chamber $l'$ and dowel-pins, substantially as described, and for the purpose specified.

Witness our hands this 30th day of January, A. D. 1875.

BURTON J. DOWNING.
HARRY D. VAN CAMPEN.

Witnesses:
CHAS. M. PECK,
ALBERT KERN.